July 6, 1948.  F. C. ELDER  2,444,639
PROJECTION METHOD FOR MEASURING THE INNER
CONTOURS OF WIRE DRAWING DIES
Filed March 11, 1944
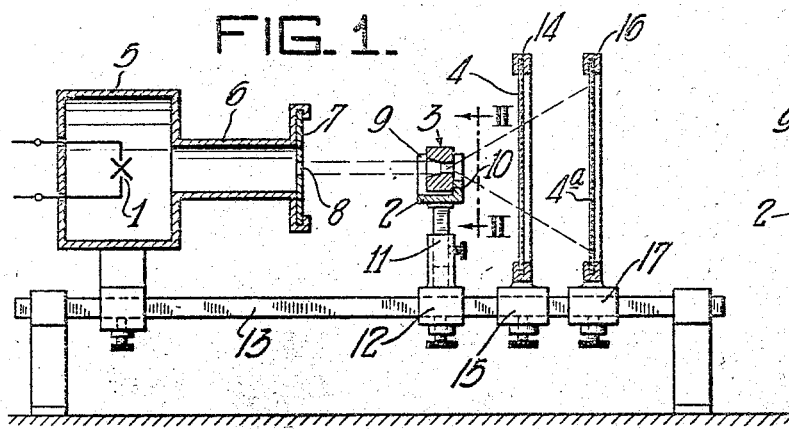
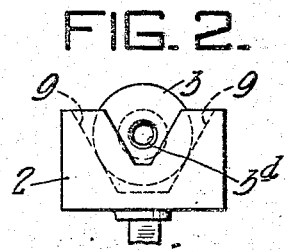
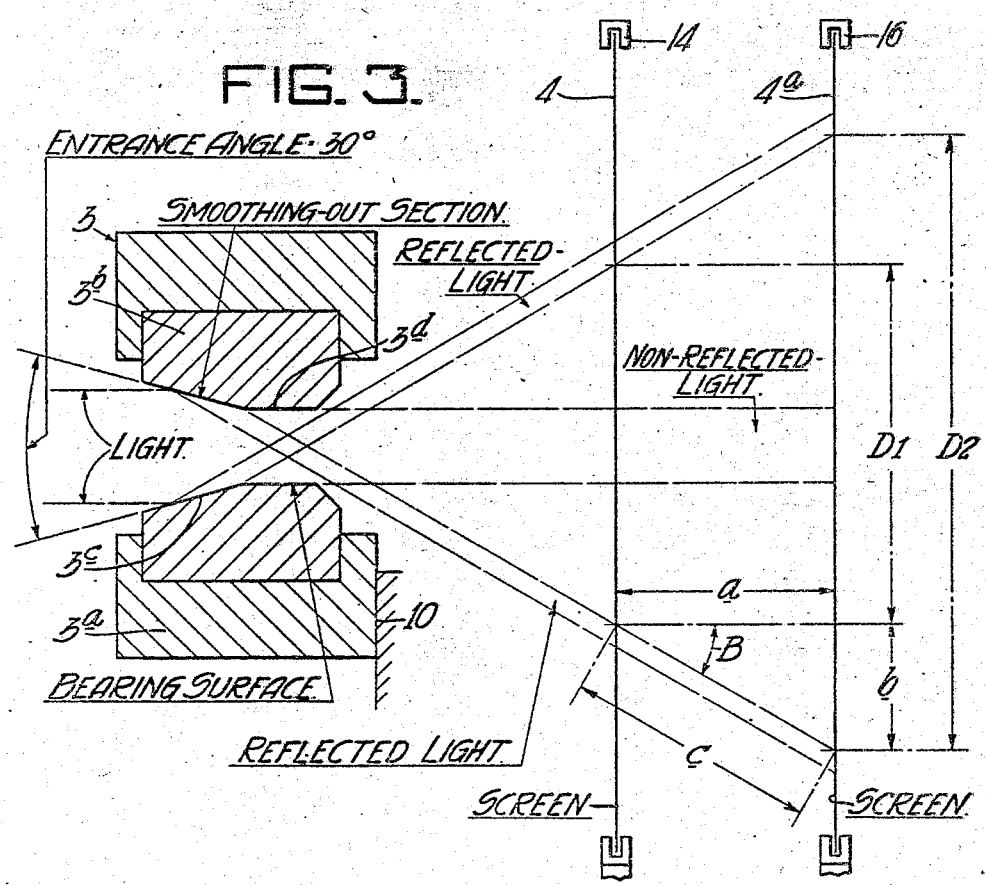
Inventor:
FLINT C. ELDER,
by John E. Jackson
his Attorney.

Patented July 6, 1948

2,444,639

UNITED STATES PATENT OFFICE 2,444,639

PROJECTION METHOD FOR MEASURING THE INNER CONTOURS OF WIRE DRAWING DIES

Flint C. Elder, Cleveland Heights, Ohio, assignor to The American Steel and Wire Company of New Jersey, a corporation of New Jersey Application March 11, 1944, Serial No. 526,030

1 Claim. (Cl. 88—24)

This invention is for measuring the inner contours of wire drawing dies, and is particularly adapted for measuring the entrance angle or angle of taper of the smoothing-out section of the die hole of a wire drawing die. Those unfamiliar with wire drawing dies and their inner contours may refer to the section starting on page 1094 of The Making, Shaping and Treating of Steel, fifth edition, published by the Carnegie-Illinois Steel Corporation.

The prior art method of determining the entrance angle or angle of taper of the smoothing-out section of a wire drawing die die-hole, is by the use of a lot of feeler gauges having conical gauging surfaces of appropriate diameters and slightly differing angles of taper, these gauges being inserted in the die hole one after another with their gauging surfaces on its smoothing-out section, and the angle of taper being determined by the gauge operator deciding which gauge feels to him to fit the smoothing-out section the best. Generally speaking, no two operators are able to agree exactly which gauge fits the best, this leading to difficulties between the die makers and the die users and aggravating the generally complexed problems encountered in wire drawing operations. It is to be understood that the entrance angle is the total angle included by diametrically opposite sides of the smoothing-out section, and that the angle of taper is the angle included between one side of the section and its axis, both terms being used and it being obvious that knowledge of one is knowledge of the other since the entrance angle is twice the angle of taper.

The present invention provides for optically determining the entrance angle of the smoothing-out section of a wire drawing die die-hole, with the attendant advantages of indisputable accuracy and precision inherent to optical measuring methods. The smoothing-out section is fairly well buried inside the die hole between its entrance and exit so that the application of optical measuring methods for the determination of the entrance angle of the die-hole smoothing-out section is unobvious and has never before been considered, but the present inventor has discovered that by projecting light through the entrance of the die hole substantially in a known direction respecting the die-hole axis onto the die-hole smoothing-out section with the light-projecting-direction providing a sufficiently large angle of reflection of this light when reflected from the smoothing-out section, this light is reflected from this section onwardly through the die hole so that the reflected light is projected beyond the die-hole exit, the light reflected from the smoothing-out section passing completely through the die hole without impinging its bearing surface. Then by measuring beyond the die-hole exit the angularity between the known direction in which the light is projected respecting the die-hole axis and the direction the reflected light is projected beyond the die-hole exit, it is possible through the application of the fundamental principles of trigonometry, with which it is assumed all engineers are familiar, to exactly determine the entrance angle of the smoothing-out section of the die hole. To provide the necessarily large angle of reflection required to project the reflected light through the die hole without further reflection introducing confusing complexities, it is necessary for the projected light, which is the incident light respecting the smoothing-out section, to very closely approach parallelism with the die-hole axis; and to avoid the need for correction for angularity between the incident light and the die-hole axis, which is required when the light projected into the die-hole axis is not parallel this axis, it is considered best to project the light into the die-hole entrance in a direction that is parallel the die-hole axis, or which at least so closely approaches parallelism therewith as to avoid any need for correction insofar as ordinary commercial measuring is concerned. In connection with this last, the described optical measuring of the entrance angle provides for accuracy exceeding the possibilities of presently known machining practices, so full utilization of the accuracy of the described method of measuring is unnecessary.

It sometimes happens that the smoothing-out section of the die hole is not made concentric with the die-hole axis, and the herein disclosed method provides a means for determining such lack of concentricity. This is done by rotating the die about its die-hole axis without changing the known direction of the light projection respecting this axis; that is to say, the direction of the light that is incident the smoothing-out section is maintained constant. Then by measuring for a plurality of rotative positions of the die beyond the die-hole exit in the same radial plane respecting the die-hole axis, the angularity between the known direction of the incident light and the direction the reflected light is projected beyond the die-hole exit, it becomes possible to determine whether the smoothing-out section is concentric the die-hole axis, since the angular values obtained by the plurality of measures are constant in the case of concentricity but vary if concentricity is lacking.

The accompanying schematic drawings illustrate apparatus suitable for optically measuring the inner contours of wire drawing dies by using the principles that have been disclosed, and also function to illustrate the method itself. In these drawings the various figures are as follows:

Figure 1 is a vertically sectioned side view of the apparatus;

Figure 2 is an end view of a detail of the apparatus taken from the line II—II in Figure 1; and Figure 3 shows the principles involved in working the invention.

More specifically, the apparatus includes a light source 1 in the form of an electric arc, means 2 for holding the wire drawing die 3 with its die-hole entrance spaced from the source 1 in substantial alignment therewith, and a light projection screen 4 positioned opposite the exit of the die hole at a known angle to its axis when the die 3 is held by the means 2. The light source 1 is sufficiently spaced from the entrance of the die 3 so that the light is projected into this entrance substantially parallel the die-hole axis, it having been found in practical work that parallelism is approached sufficiently, with such an arrangement, to render unnecessary the need for condensing lenses with their attendant cooling and cleaning problems, it being understood that the light source 1 must radiate light with considerable intensity, particularly when the die hole whose contour is being examined is of the smaller diameters used in drawing fine wire. For obvious reasons, the light source 1 is enclosed in a housing 5, and this housing is preferably provided with an optical tube 6 in the end of which is mounted a diaphragm plate 7 having an aperture 8 for restricting the light radiated from the light source, to the die 3, approximately to the amount required to just about cover the entire periphery of the smoothing-out section of the die hole, this being in the interest of preventing undue heating of the die. The plate 7 is removable so that other plates may be substituted having suitably shaped apertures 8 for various sizes of dies. An iris diaphragm may be used but it introduces complications in its operation due to the heating it receives and the dirt with which it is apt to be contaminated in mill use of the apparatus.

The means 2 is illustrated as being a simple rest having downwardly tapering surfaces 9 in which the periphery of the die 3 rests and a surface 10 normal the surfaces 9 and which provides a bearing surface for engaging the die-holder bearing face of the die 3, around its die-hole exit, and holding this bearing face normal the direction the light is projected from the source 1 into the die-hole entrance. Rotation of the die 3 may be accomplished by manually turning the die, the surfaces 9, engaging the die periphery, tapering so the die may be rotated about its axis properly, providing the die outside periphery is concentric to the die-hole axis, which this periphery should be in a properly made die. The surface 10, against which the die may be held flatly, serves to further steady the die during its rotation providing the dies' die-holder bearing surface is normal the die axis, which it also should be in a properly made die.

In connection with the foregoing, it is to be understood that the die 3 is shown as a tungsten carbide die of the type having the tungsten carbide nib incased in a steel shell having a cylindrical exterior and a face surrounding the die-hole exit which should be truly at right angles to this periphery and to the die-hole axis, while the cylindrical periphery should be truly cylindrical about this axis, if the die is properly made. Such dies are used for drawing fine wire sizes and have the smaller diameters which heretofore presented the most difficulty in properly measuring their die-hole inside contours.

The die holder 3 is shown as having a mounting 11, permitting its vertical adjustment, which is carried by a slide 12 working on a slide bar 13 which also carries the housing 5 for the light source 1, the slide-bar arrangement being like that conventionally used in the case of optical instruments.

The light projection screen 4 is removably mounted by a screen holder 14 which is itself held normal the optical axis of the apparatus by a slide 15 working on the slide bar 13, the known angle between the screen and die-hole axis being a right angle in this instance. The screen 4 is shown as being adapted to be slid laterally into the holder 14, and the latter is in the form of a frame permitting free light passage when the screen 4 is removed.

In using the apparatus as it has been described so far, the die 3 is settled snugly into the downwardly tapering surfaces or V-shaped portion 9 of the die holding means 2, with its die-hole entrance facing the light source 1 and its die-holder bearing surface flatly positioned against the surface 10 of the die holding means 2. Assuming the light source 1 to be in operation, light is projected therefrom through the aperture 8 and onto the die 3, the die holding means being adjusted vertically by use of its mounting 11 until the beam of light projected through the aperture 8 of the diaphragm plate 7 registers with the die-hold entrance. If the beam of light covers too much area it may be restricted by the use of another diaphragm plate 7 having a smaller aperture 8, or by one having a larger aperture in case the light beam seems too narrow.

Now, assuming the light source 1 to provide light of sufficient intensity, a disk of light appears, on the light projecting screen 4, surrounded by an annulus of light formed by the reflected light from the smoothing-out section of the die hole. If the die is properly positioned, the disk of light should be vertically midway between the light annulus, which may be ascertained by direct measurement, but if it is not the die holding means 2 may be raised or lowered as required to effect this relative positioning. Once the light disk is positioned vertically exactly intermediate the light annulus, the die hole is in optical alignment axially with the light source 1, it being understood that the die holding means 2 is precisely constructed for horizontal positioning of the die 3 with its die-hole axis in proper horizontal alignment with the light source 1.

If at this time the disk of light is not horizontally midway the extremes of the light annulus, it is because either the bearing surface or smoothing-out section of the die lacks concentricity either with each other or with the dies' cylindrical exterior. Manual rotation of the die in the die holding means serves to answer the questions thus introduced, shifting of the light disk formed by the unreflected light indicating lack of concentricity of the die-hole inside contour, generally, with the cylindrical die outside, whereas if this disk remains fixed in position during die rotation, but the light annulus varies in position, lack of concentricity of the smoothing-out section respecting the die-hole axis is indicated. Furthermore, if the die holder bearing face around the die-hole exit is kept firmly pressed against the surface 19 of the die holding means 2 during rotation of the die 3, and the position of the light disk on the screen 4 shifts, it becomes obvious that this bearing face of the die is not normal the die-hole axis as it should be. Therefore, by resorting to these various manipulations it becomes possible to quickly and accurately determine whether the various die parts are in their proper relative relationships.

The apparatus illustrated by Figure 1 also includes a second light projection screen holder 16 constructed the same as the screen holder 14 and provided with a slide 17 working on the slide bar 13.

Since the light annulus appearing on the screen 4 while it is in the holder 14, and which is formed by the reflected light from the die-hole smoothing-out section, represents a conical light annulus whose conical angularity is fixed by the angularity of the die-hole smoothing-out section, it becomes possible, by measuring the conical angularity of this conical annulus, to determine the angularity of this smoothing-out section. This is done by positioning the projection screen holders 14 and 16 so as to hold the projection screen 4 at two positions spaced apart a known distance beyond the die-hold exit of the die 3, and by then measuring either the different diameters of the light annuli that appear on the screen in its two positions, or the distance between the light disk that appears on the screen in both positions and the different distances between this light disk and the light annuli that appear in both positions, to then, by simple trigonometry, measure the entrance angle of the die-hole smoothing-out section.

Illustration of the foregoing is the function of Figure 3, this showing the die in longitudinal section with its steel casing 3ª and its tungsten carbide nib 3ᵇ, the die-hole smoothing-out section being shown at 3ᶜ and the die-hole bearing surface being shown at 3ᵈ. The substantially parallel light coming from the light source 1 is legended as is the reflected light and the nonreflected light respectively forming the light annuli and the light disk. The light is being projected in a direction substantially parallel the die-hole axis, so its direction is known relative thereto, and has sufficient coverage to impinge on the entire periphery of the smoothing-out section 3ᶜ, from which it is reflected to the screen 4, the nonreflected light passing directly to this screen. When the screen 4 is positioned by the screen holder 14 the distance D1 diametrically between the inner periphery of the light annulus appearing thereon is measured, and the screen 4 is then shifted to the holder 16 and the same distance remeasured, or the screen 4 may be removed and another screen 4ª already in place in the holder 16 used to receive the light annulus which is now of the greater diameter D2. The distance between the two screen positions being known, half the difference between the values D1 from D2, i. e. the amount of the change in the radius of the image, provides the now known base $b$ of a right triangle having an altitude $a$ equaling the known distance between the two screen positions, and with its hypotenuse $c$ and altitude $a$ defining the angle B, the value of which can easily be solved by trigonometry and which has the same value as the entrance angle of the smoothing-out section of the die hole. It is to be remembered that the direction of the incident light respecting the die-hole axis is known, it being substantially parallel thereto in the case of the apparatus disclosed, that the screen 4 is positioned by both the holders 14 and 16 normal the die-hole axis so its angularity respecting this axis is known, and that the distance between the two screen positions is known. If the angle of taper of the smoothing-out section is desired, it may be obtained simply by dividing by two the value of the angle B when it is calculated.

When the relatively spaced positions of the light source, die and screen remain fixed, it is possible to calibrate the screen so that it is unnecessary to inconvenience the operator by making him resort to trigonometric calculations. That is to say, in such an instance the diameter of the light annulus and the position of any portion of the same on the screen is a direct result of the angularity of the smoothing-out section, so observation of the position of any portion of the light annulus on a screen that has previously been calibrated provides for direct reading of the value of this angularity, since it provides for directly measuring the angularity between the light projecting direction and the projecting direction of the reflected light, with correction for any angularity between the first direction and the die-hole axis if such exists.

I claim:

A method including projecting light through the entrance of the die hole of a wire drawing die substantially parallel the die hole axis onto the periphery of the die hole smoothing-out section and through the die hole bearing surface section, spacing a light projection screen beyond the exit of said die hole at a right angle to its axis, measuring the image projected on said screen by the reflected light emitting from the exit of said die hole, altering the initial spacing between the exit of said die hole and said screen a known amount while maintaining the said angularity between the die hole axis and said screen, measuring the image projected on said screen when located in said second position, the amount of the change in the radius of said image resulting from altering the spacing between the exit of the die hole and screen forming the base of a right triangle, the altitude of said triangle being the said known amount of the altering of the spacing between the exit of of the die hole and the screen, and determining the included angle between the altitude and hypotenuse of the said triangle to determine the angle of the smoothing-out section of said die.

FLINT C. ELDER.

REFERENCES CITED

The following references are of record in the file of this patent:

UNITED STATES PATENTS

| Number | Name | Date |
| --- | --- | --- |
| 1,227,528 | Chidley | May 22, 1917 |
| 1,228,685 | Magowan | June 5, 1917 |
| 1,260,221 | McCormack | Mar. 19, 1918 |
| 1,401,664 | Beman | Dec. 27, 1921 |
| 1,775,452 | Fisher | Sept. 9, 1930 |
| 1,799,604 | Read | Apr. 7, 1931 |
| 1,813,185 | Millar et al. | July 7, 1931 |
| 2,155,248 | Adams et al. | Apr. 18, 1939 |
| 2,221,154 | Soper | Nov. 12, 1940 |
| 2,256,228 | Zimmermann | Sept. 16, 1941 |
| 2,261,772 | Longfellow | Nov. 4, 1941 |